(12) United States Patent
Taleb

(10) Patent No.: US 12,289,810 B2
(45) Date of Patent: Apr. 29, 2025

(54) METHOD FOR OPERATING AN AUTOMOTIVE LIGHTING DEVICE AND AUTOMOTIVE LIGHTING DEVICE

(71) Applicant: VALEO VISION, Bobigny (FR)

(72) Inventor: Rabih Taleb, Bobigny (FR)

(73) Assignee: Valeo Vision, Bobigny (FR)

( * ) Notice: Subject to any disclaimer, the term of this patent is extended or adjusted under 35 U.S.C. 154(b) by 70 days.

(21) Appl. No.: 18/250,549

(22) PCT Filed: Oct. 28, 2021

(86) PCT No.: PCT/EP2021/080061
§ 371 (c)(1),
(2) Date: Apr. 26, 2023

(87) PCT Pub. No.: WO2022/090431
PCT Pub. Date: May 5, 2022

(65) Prior Publication Data
US 2023/0403775 A1    Dec. 14, 2023

(30) Foreign Application Priority Data

Oct. 30, 2020   (FR) ..................................... 2011167

(51) Int. Cl.
*H05B 45/28* (2020.01)
*B60Q 1/14* (2006.01)

(52) U.S. Cl.
CPC ........... *H05B 45/28* (2020.01); *B60Q 1/1415* (2013.01)

(58) Field of Classification Search
CPC ........ H05B 45/28; H05B 45/44; H05B 47/14; H05B 47/155; B60Q 1/02
See application file for complete search history.

(56) References Cited

U.S. PATENT DOCUMENTS

| 10,400,973 B1 * | 9/2019 | Espinosa ................. F21S 43/14 |
| 11,304,278 B2 | 4/2022 | Hoffmann |
| 2013/0201677 A1 | 8/2013 | Ter Weeme |
| 2014/0218953 A1 * | 8/2014 | Ungru ................... F21S 41/141 362/545 |

FOREIGN PATENT DOCUMENTS

KR    1020200090882 A    7/2020

OTHER PUBLICATIONS

European Patent Office, International Search Report and Written Opinion of corresponding International Application No. PCT/EP2021/080061, dated Feb. 24, 2022.
Korean Patent Office, Office Action (with English translation) of corresponding Korean Application No. 2023-7014122, dated Aug. 30, 2024.

* cited by examiner

*Primary Examiner* — Daniel D Chang
(74) *Attorney, Agent, or Firm* — Valeo Vision

(57) ABSTRACT

An automotive lighting device with a control element and a method for operating an automotive lighting device including at least two solid-state light modules. The method includes defining a homogeneity criterion for each pair of colors, feeding the first light module with a first current value which produces a first output color in the first light module and feeding the second light module with a second current value which produces a second output color in the second light module, with the first output color and second output color fulfilling the homogeneity criterion.

14 Claims, 3 Drawing Sheets

METHOD FOR OPERATING AN AUTOMOTIVE LIGHTING DEVICE AND AUTOMOTIVE LIGHTING DEVICE

TECHNICAL FIELD

This invention is related to the field of automotive lighting devices, and more particularly, to the color management of these light sources comprised in these devices.

BACKGROUND OF THE INVENTION

Digital lighting devices are being increasingly adopted by car makers for middle and high market products.

These digital lighting devices usually comprise solid-state light sources, the operation of which heavily depends on temperature.

Temperature control in these elements is a very sensitive aspect, and is usually carried out by derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

Further, these techniques also affect to the color of the output pattern. In some cases, when a beam pattern is provided by more than one light module, color may not be homogeneous in the whole pattern.

SUMMARY OF THE INVENTION

This problem has been assumed until now, but a solution therefor is sought.

The invention provides an alternative solution for managing the output color of the light source patterns by a method for operating an automotive lighting device and an automotive lighting device.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least two solid-state light modules, the method comprising the steps of:
  defining a homogeneity criterion, wherein for each pair of colors which is composed of the color emitted by the first light module and the color emitted by the second light module, the pair is defined to be acceptable or not acceptable;
  feeding the first light module with a first current value which produces a first output color in the first light module;
  feeding the second light module with a second current value which produces a second output color in the second light module, wherein the pair first output color-second output color fulfils the homogeneity criterion.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The homogeneity criterion is defined as the similarity between a pair of output colors, i.e. between the color emitted by the first light module and the color emitted by the second light module. It may be defined, for instance, in terms of RGB ranges or in terms of a distance in a color diagram, but any definition of a skilled technician will be part of the scope of this invention.

As an example, each pair of output colors is defined at a specific measurement time.

By means of this method, the lighting device is able to calculate if the output color is acceptably homogeneous, and may react to a non-allowance situation by modifying the feeding current of at least one of the two modules, so that the color is always kept within the homogeneity criterion.

In some particular embodiments, the above-presented method further comprises a step of measuring the temperature in the second light module, and wherein the second current value is calculated from a datasheet and/or experimental data using the first output color and the temperature measured in the second light module as input values.

There are many alternative ways of obtaining the output color of the light source. Sometimes, manufacturer's datasheets provide reliable and useful information about these parameters, but experimental data may also be used to obtain this allowance condition.

In this case, the second current is calculated from the data obtained from the first light module, so the first light module leads the method and the second light module has a slave configuration in terms of color homogeneity.

In another example, the second value is calculated from a datasheet and/or experimental data using a chosen color and the temperature measured in the second light module as input values.

In some particular embodiments, the first current value is calculated from theoretical and/or experimental data using a chosen color and the temperature measured in the first light module as input values.

In this case, the method further comprises the steps of:
  choosing a color to be emitted by the first light module, otherwise called chosen color; and
  measuring the temperature in the first light module,
  wherein the chosen color and the measured temperature in the first light module are used as input values for calculating the first current value such that when the first light module is fed with the first current value, the first output color is substantially identical to the chosen color.

In this particular case, this decision is related to the color, and the first current value is decided according to this preliminary provision.

In the case where both the first current value and the second value are calculated from a chosen color, a preliminary decision has been adopted regarding the color to be projected by the lighting device, and both the first and the second light modules are adapted to this decision.

In the present document, the "chosen color" means a reference color that complies with colorimetric regulations, and, eventually with the request of the manufacturer of the lighting device.

In some particular embodiments, the temperature in the first light module and/or the temperature in the second light module are obtained by a thermistor, such as a negative temperature coefficient thermistor.

A thermistor is a common element which may be employed to measure a temperature, thus providing a reliable starting point for this method.

In some particular embodiments, the method further comprises the steps of further comprising the step of increasing or decreasing the first and/or second current value if the homogeneity criterion is not fulfilled.

The output color in any of the first and second light module may vary due to the temperature of the light module. For a given value of electric current, the color may vary for different module temperatures. Hence, a correction may be needed.

In some particular embodiments, the method further comprises the steps of:
defining a color allowance condition for each of the first light module and the second light module, wherein for each pair temperature-electrical current, a color is defined to be acceptable or not acceptable;
establishing a minimum luminous flux threshold value and a maximum luminous flux threshold value for each of the first light module and the second light module;
checking whether the first and second output colors satisfy the respective allowance condition of each of the first and second light modules;
increasing or decreasing the first and/or second current value, always keeping the current such as it produces a luminous flux value comprised between the minimum luminous flux threshold value and the maximum flux threshold value and producing a color which satisfies the allowance condition.

The homogeneity criterion may be combined, as in this case, with other allowability criteria. The variation in the current value should be integrated with every requirement, to provide a unified suitable value of electric current for each light module.

It is noted that the color allowance condition of the first light module and of the second light module may be identical. Further, the minimum flux threshold value of the first light module and of the second light module may be the same, as well as for the maximum threshold value.

Further, the method may comprise a step of determining the first output color and the second output color.

As an example, the first output color, i.e. the color emitted by the first light module, and the second output color, i.e. the color emitted by the second light module, are similar to a chosen color from a preliminary decision.

In another example, the chosen color is assigned only to the first output color. In this case, the second output color is determined from a theoretical and/or experimental method by using the first output color as input value. Alternatively, the first output color and the temperature measured in the second light module can be both used to determine the second output color.

In another embodiment, the first light module and the second light module are fed respectively by the first current value and the second current value. In this case, the first output color and the second output color are measured by appropriate means, e.g. a color sensor. Alternatively, the first output color is calculated from the first current value and the temperature measured in the first light module. The second output color is calculated from the second current value and the temperature measured in the second light module.

In some particular embodiments, the step of increasing or decreasing the first and/or second current value involves increasing or decreasing said first and/or second current value from a first value to a second value, wherein the greater is lower than 1.1 times the lesser of them, particularly lower than 1.05 times the lesser of them and particularly lower than 1.03 times the lesser of them.

In these examples, the intensity may be increased in small ranges, so that the current value (and the temperature) are kept as low as possible within a range which provides an acceptable performance. Further, color deviations may be corrected with the minimum impact possible on performance.

In some particular embodiments, the method further comprises the step of recording a sequence of current value increments for predetermined conditions.

This sequence may be useful if using a time-based pattern, to avoid a continuous temperature measurement.

In some particular embodiments, at least some of the steps of the method are carried out by a control unit which is configured to estimate a temporal pattern for the electric current provided to the first and second light modules by:
training the control unit to estimate an electric current for first and/or second light modules with a training dataset; and
testing the control unit with real electric current data.

The control unit may undergo an artificial intelligence strategy to foresee the most suitable evolution of the first and second current. To do so, the control unit is trained with a training dataset which may comprise different inputs: current of other modules, external conditions, vehicle speed, driver's decisions . . . With these values, the control unit is trained to foresee the best evolution of the first and second current values.

In a further inventive aspect, the invention provides a data processing element comprising means for carrying out the steps of a method according to the first inventive aspect and a computer program comprising instructions which, when the program is executed by a control unit, cause the control unit to carry out the steps of a method according to the first inventive aspect.

In a second inventive aspect, the invention provides an automotive lighting device comprising:
at least two solid-state light modules, each one comprising a matrix arrangement of solid-state light sources;
a control element for performing the steps of the method according to the first inventive aspect;
This lighting device provides the advantageous functionality of efficiently managing the color homogeneity of the light sources.

In some particular embodiments, the matrix arrangement comprises at least 2000 solid-state light sources.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

BRIEF DESCRIPTION OF DRAWINGS

In some particular embodiments, the lighting device further comprises a thermistor intended to measure the temperature of the solid-state light sources.

DETAILED DESCRIPTION OF THE INVENTION

Figure 1:
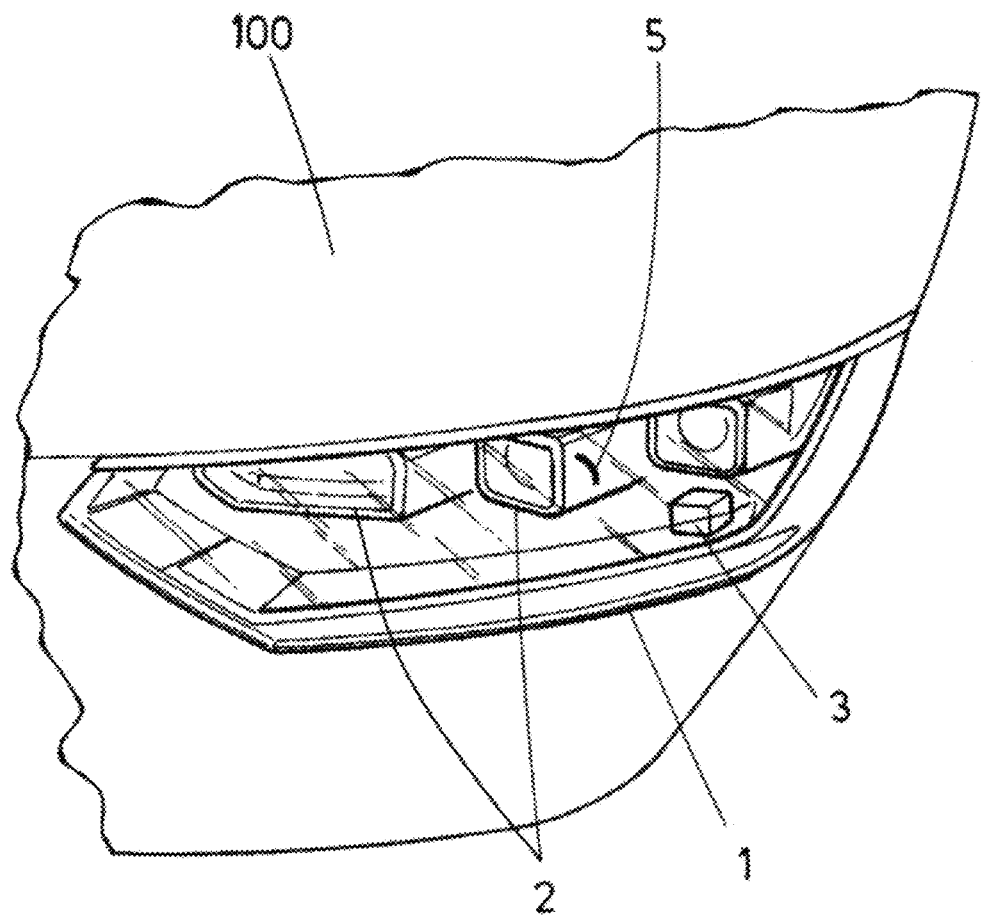
FIG. 1 shows a general perspective view of an automotive lighting device according to the invention.

In these figures, the following reference numbers have been used:
1 Lighting device
2 Light module
3 Control element
4 Minimum luminous flux threshold value
41 First current value
42 Second current value
5 Thermistor
6 Non-allowance dots
7 Maximum luminous flux threshold value
11 Total light pattern
12 Flat
13 Kink
14 Homogeneity criterion
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 1 is installed in an automotive vehicle 100 and comprises
  a matrix arrangement of two light modules 2, intended to provide a light pattern;
  a control element 3 to perform a control of the operation of the light modules 2; and
  a thermistor 5 intended to measure the temperature in the light modules 2.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixelated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one solid-state light source emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source, specifically a laser diode, emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
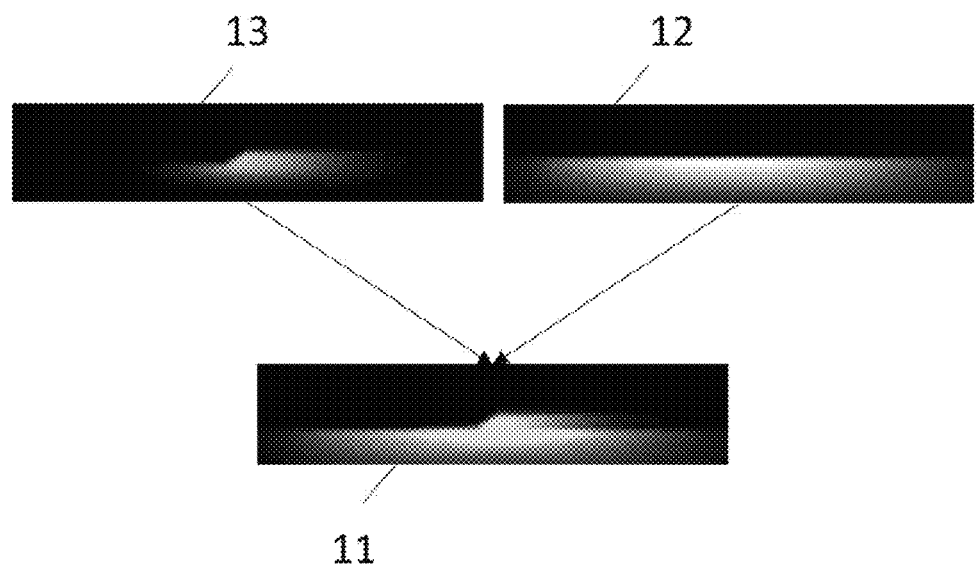
FIG. 2 shows a first scheme where a light pattern is described to be comprised of the projection of two different light modules.

FIG. 2 shows a scheme where a light pattern is described to be comprised of the projection of two different light modules.

In this example, which corresponds to a low beam pattern, the complete pattern projection 11 may be divided into a first portion 12 and a second portion 13. In this particular pattern, the first portion 12 is usually called "flat" and the second portion 13 is usually called "kink". A first light module is in charge of projecting the "flat" 12 and a second light module is in charge of projecting the "kink" 13.

Since both portions 12, 13 are intended to form a unique pattern 11, it is important that the output colors of these light modules are as similar as possible.

Figure 3:
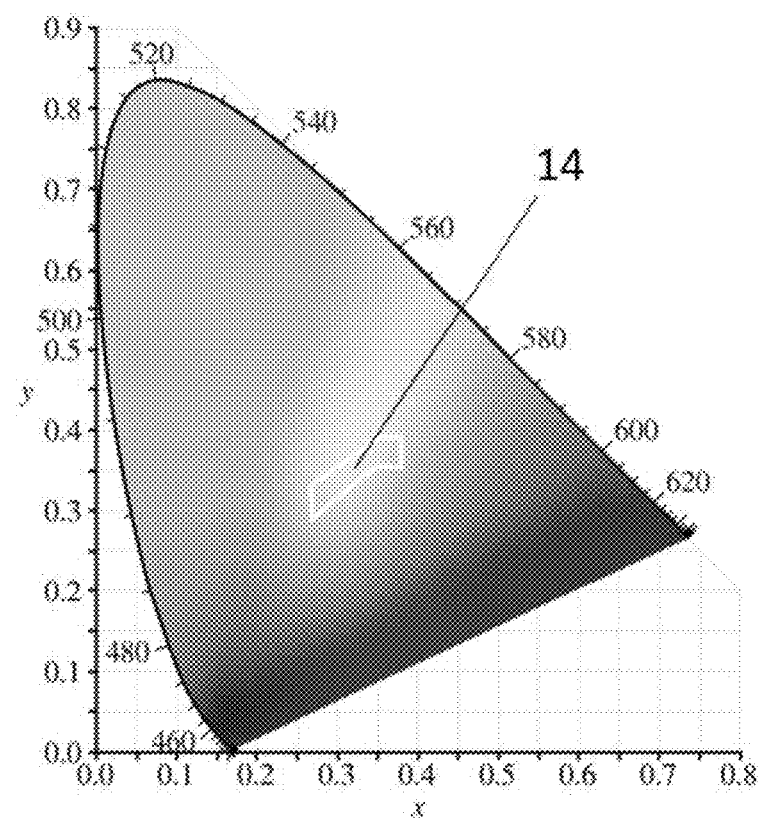
FIG. 3 shows a color graphic representation, with the homogeneity criterion where the pair of output colors are contained in the "white zone".

A homogeneity criterion is defined by the manufacturer, in terms, for example, of a range within the RBG pattern or distance in a color graphic representation, such as the one of FIG. 3.

FIG. 3 shows a color graphic representation, where the homogeneity criterion is that the pair of output colors are contained in the "white zone" 14. This is an example of criterion, although the skilled technician could establish any similar one.

Figure 4:
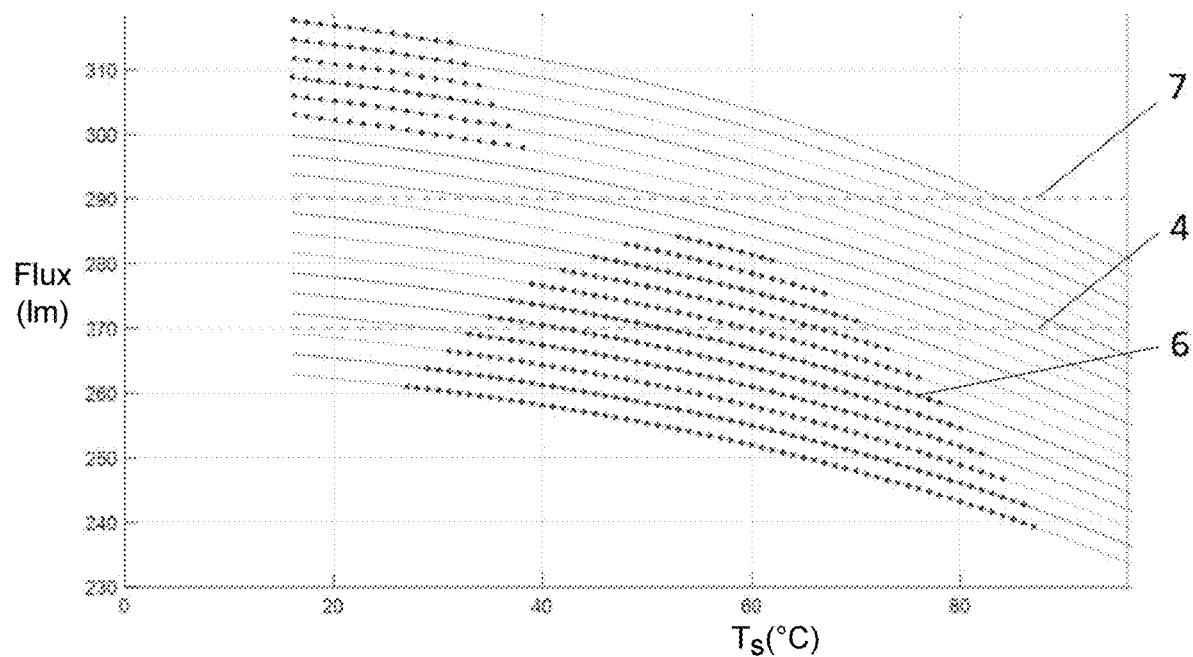
FIG. 4 shows a graphic scheme which represents the luminous flux values produced by the LED when fed by a particular electric current and is under a particular temperature.

FIG. 4 shows a graphic scheme which represents the luminous flux values produced by the LED when fed by a particular electric current and is under a particular temperature. Further, some non-allowance dots 6 have been added to this graph. The dots 6 represent combinations of current and temperature which provide a color which is outside the homogeneity zone 14 of FIG. 3.

In this graph, a minimum luminous flux threshold value 4 and a maximum flux threshold value 7 are also represented.

In this particular embodiment of the method according to the invention, the operation of the light source is controlled under some premises.

First one is that luminous flux should be kept between the minimum luminous flux threshold value 4 and the maximum luminous flux threshold value 7.

Second one is that the output color should fulfil the homogeneity criterion, i.e., be kept out from the non-allowance dots 6 represented in the graph.

This performance is controlled by the amount of electrical current which is provided to the LED. The variation in the electrical current causes a variation of the luminous flux and a variation of the output color.

Hence, small variations are to be used, to provide an accepted performance in terms of color and luminous flux.

Several options may be used to achieve this goal.

In a first option, the first module is fed with an electric current which is comprised between the thresholds 4, 7 of FIG. 4. Then, the first output color is measured and, using theoretical and experimental data, a second current value is chosen to feed the second module to obtain the same color as the first output color. In other words, the second current value is chosen such that the first output color and the second output color fulfil the homogeneity criterion.

In a second option, a color is chosen from the graphic of FIG. 3. Using the theoretical and experimental data of each module, a first current value and a second current value are obtained to provide first and second output colors which are similar to the chosen one to fulfil the homogeneity criterion.

In a third option, first and second modules are fed with first and second current values, respectively. Then, output colors are measured and one of the current values are modified if necessary to make one of the output colors closer to the other one to satisfy the homogeneity criterion.

Figure 5:
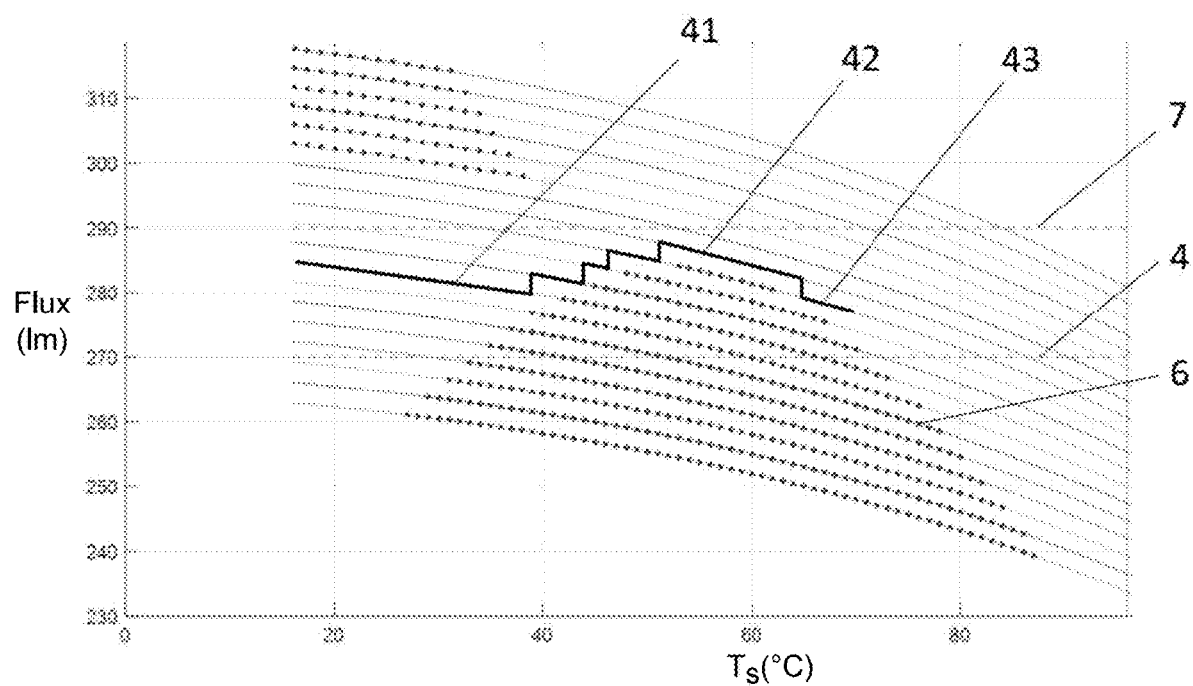
FIG. 5 shows an example of the evolution of the electric current in the LED in a method according to the invention.

FIG. 5 shows an example of the temporal evolution of the electric current in one of the light modules of the lighting device according to the invention.

A first current value 41 is chosen between the threshold values 4, 7. Then, when the control unit decides that there is a reason to increase the electric current (to avoid non-allowance dots 6 or because any other reasons), the current value is increased. However, the current value may also be decreased from two values 42, 43 if the luminous flux is too high of if, by homogeneity reasons, it is advisable to do so.

The control unit may be designed to decide which is the best option (unless one of the options are taken as provided by the car manufacturer) and how should these current values be managed.

To do so, the control unit may be trained in artificial intelligence algorithms, using the data provided by external sensors.

In a first process, the control unit is trained. To do so, a map as the one of FIG. 4 is provided for each light module, so that the boundary conditions are clearly established.

Then, data is provided from external sensors, with module temperatures, module current values, external temperature, vehicle speed, driver's settings, and so on. The control unit uses these data to obtain the optimal first and second current value in each moment, and these results are tested with values provided by the manufacturer. When this training-testing process is finished, the control unit is ready to be installed in the automotive lighting device and control the current values of the two light modules.

The invention claimed is:

1. A method for operating an automotive lighting device including at least two solid-state light modules, the method comprising:
    defining a homogeneity criterion, wherein for each pair of colors which is composed of the color emitted by the first light module and of the color emitted by the second light module, the pair is defined to be acceptable or not acceptable;
    feeding the first light module with a first current value which produces a first output color in the first light module; and
    feeding the second light module with a second current value which produces a second output color in the second light module, wherein the pair first output color-second output color fulfils the homogeneity criterion and measuring a temperature in the second light module, and wherein the second current value is calculated from a datasheet using the first output color or a chosen color with a temperature measured in the second light module as input value.

2. The method according to claim 1, wherein the first current value is calculated from theoretical and/or experimental data using a chosen color with a temperature measured in the first light module as input value.

3. The method according to claim 1, further comprising:
    choosing a chosen color to be emitted by the first light module; and
    measuring a temperature in the first light module, with the chosen color and the measured temperature in the first light module are used as input values for calculating the first current value such that when the first light module is fed with the first current value, the first output color is substantially identical to the chosen color.

4. The method according to claim 1, wherein a temperature in the first light module and/or a temperature in the second light module are obtained by a thermistor.

5. The method according to claim 1, further comprising adjusting the first and/or second current value if the homogeneity criterion is not fulfilled.

6. The method according to claim 5, wherein adjusting the first and/or second current value involves increasing or decreasing the first and/or second current value from a first value to a second value, wherein the larger of the first value or the second value is less than 1.1 times the smaller of the first value or the second value.

7. The method according to claim 5, wherein adjusting the first and/or second current value involves increasing or decreasing the first and/or second current value from a first value to a second value, wherein the larger of the first value or the second value is less than 1.03 times the smaller of the first value or the second value.

8. The method according to claim 1, further comprising:
defining a color allowance condition for each of the first light module and the second light module, wherein for each pair temperature-electrical current, a color is defined to be acceptable or not acceptable;
establishing a minimum luminous flux threshold value and a maximum luminous flux threshold value for each of the first light module and the second light module;
checking whether the first and second output colors satisfy the respective allowance condition of each of the first and second light modules:
adjusting the first and/or second current value, always keeping the current such as the first and/or second light module produces a luminous flux value comprised between the minimum luminous flux threshold value and the maximum flux threshold value and producing a color which satisfies the allowance condition.

9. The method according to claim 1, further comprising determining the first output color and the second output color.

10. The method according to claim 1, further comprising recording a sequence of current value increments for predetermined conditions.

11. The method according to claim 1, wherein at least some of the method is carried out by a control unit which is configured to estimate a temporal pattern for the electric current provided to the first and second light modules by
training the control unit to estimate an electric current for first and/or second light modules with a training dataset; and
testing the control unit with real electric current data.

12. The method according to claim 1, wherein a temperature in the first light module and/or a temperature in the second light module are obtained by a negative temperature coefficient thermistor.

13. An Automotive lighting device comprising:
at least two solid-state light modules, each solid-state light module including a matrix arrangement of solid-state light sources;
a control element configure to:
define a homogeneity criterion, wherein for each pair of colors which is composed of the color emitted by the first light module and of the color emitted by the second light module, the pair is defined to be acceptable or not acceptable;
feed the first light module with a first current value which produces a first output color in the first light module; and
feed the second light module with a second current value which produces a second output color in the second light module, wherein the pair first output color-second output color fulfils the homogeneity criterion and measuring a temperature in the second light module, and wherein the second current value is calculated from a datasheet using the first output color or a chosen color with a temperature measured in the second light module as input value.

14. The automotive lighting device according to claim 13, further comprising a thermistor intended to measure the temperature of the solid-state light sources.

* * * * *